Patented Jan. 26, 1937

2,068,641

UNITED STATES PATENT OFFICE 2,068,641

SPALLING RESISTANT REFRACTORY BRICK

George Milroy Carrie, Montreal, Quebec, and James William Craig, Frank Eugene Lathe, and Arthur Clarence Halferdahl, Ottawa, Ontario, Canada No Drawing. Application July 16, 1931, Serial No. 551,288. In Canada January 31, 1931

5 Claims. (Cl. 106—9)

This invention relates to spalling-resistant refractory and chemically neutral brick and it resides more particularly in the composition of the brick which imparts to them the important physical and chemical characteristics hereinafter fully described.

It is well known that many metallurgical operations are limited by the deficiencies of the refractories used. For example, the temperature of basic copper converters must be kept down to a point at which the magnesite brick lining will remain covered with, and be protected by, a coating of magnetite. In open-hearth steel furnaces the softening point of the refractories used in furnace construction fixes the upper limit of temperature permissible, and the speed of operation is thereby seriously restricted. In this case, moreover, the silica roof brick are chemically attacked by basic paticles emanating from the charge, thereby necessitating replacement of the roofs, and consequent serious delays, at more or less frequent intervals. Further, magnesite and chromite brick, used in portions of many metallurgical furnaces, spall badly when subjected to frequent heating and cooling, resulting in costly operating delays and renewals.

It is the object of this invention to provide a brick which will overcome in large part the objections above noted. This it does by combining the following very valuable properties:

1. High resistance to chemical attack by slags or particles emanating from the charge, whether acid or basic.

2. Greatly reduced tendency to spall, when subjected to alternate heating and cooling.

In accordance with this invention these important characteristics are produced in the burned brick by combining chrome iron ore and dead-burned magnesian clinker, the latter preferably containing a substantial proportion of lime, and, for best results, by having present in the composite mass both coarse and fine material, with chromite constituting, in whole or in part, the coarse constituent.

The materials used for making this brick comprise:

A. 1. Chrome iron ore, and

2. A magnesian clinker normally containing about 15–25% of lime (CaO), 4–8% of silica ($SiO_2$) and 6–9% of iron oxide ($Fe_2O_3$), and which has been dead-burned or sintered at a temperature of 1400° C. or above, so that the uncombined magnesia is converted into the inert mineral periclase; or B. Alternative materials:

1. Chrome iron ore, and

2. Dead-burned or sintered grain magnesite, as for example Austrian grain magnesite, burned at a temperature of 1400° C. or above, and 3. (a) Dead-burned grain dolomite, such as is used for open-hearth furnace bottoms, or (b) Lime in other suitable form.

The portion of the chrome iron ore used in making these brick may be varied from about 15 to 50%.

The preferred composition of these brick is about 30% of chrome iron ore and 70% of a dead-burned or sintered magnesian clinker containing about 18% of lime, as ordinarily produced from the dolomitic magnesite of the Grenville district, Quebec, for use in open-hearth steel manufacture. For the magnesian clinker, however, there may be substituted a straight dead-burned magnesite, such as American or Austrian, with which is incorporated an equivalent amount of lime, introduced as dead-burned dolomite or in other suitable form. Indeed, a fairly satisfactory brick, resistant to spalling, may be produced without the introduction of lime. Ordinarily, however, without some such material to effect a bonding action the brick is not sufficiently strong mechanically for general use.

Within the range 15% to 50% of chrome iron ore the brick containing lime are normally stronger mechanically with the lower proportions of chromite. The particular composition to be chosen will depend upon the special properties required, and variation may even be made outside the limits given in order to develop certain desired properties to a maximum degree.

To obtain brick of extremely high resistance to spalling the proper proportioning of grain sizes is of fundamental importance. It is essential not only to have both coarse and fine material present, but to have chromite as the coarse constituent, in whole or in part, since it has been found that fine chromite and coarse magnesite do not make brick of the highest spalling resistance.

The compositions and grain sizes given in the table represent some of those used in making brick which possess—although not all to the same degree—the desirable properties enumerated above; the invention is not limited, however, to these particular compositions and grain sizes.

The spalling tests referred to in the table were made by alternately exposing the brick under test to a temperature of 1200° C. for a total period of heating of 50 minutes, followed by a 10-minute cooling period while subjected to a current of air supplied at room temperature by an ordinary electric fan. A "cycle" consists of a period of heating followed by one of cooling, the total time in each case being one hour per cycle.

The significance of the remarkable spalling resistance shown in the accompanying table is indicated by the fact that ordinary commercial magnesite brick of good standard quality, when subjected to similar tests, spalled on an average after nine cycles at 950° C., and invariably spalled in the first cycle at 1200° C. Yet some of the special brick tested remained entirely intact when the tests were discontinued after 30 cycles at 1200° C.

The inert chemical character of the brick is shown by the fact that they can be burned and used in actual contact with silica, magnesite or chromite brick without any damage whatsoever to either.

In the following table the minus sign indicates that the material passes through the screen and the plus sign that the material remains on a screen having the number of meshes per inch stated.

Table

| No. | Constituents | Grain size, meshes per linear inch | | | | | Spalling test |
|-----|--------------|------|------|------|------|-----|---------------|
| | | −8 +10 | −10 +14 | −14 +28 | −28 +48 | −48 | No. of cycles before spalling began, when brick were heated to 1200 deg. C., and cooled alternately, as described |
| 1 | Chromite, %.. | 15 | 15 | | | | *30 |
| | Dolomitic magnesite, %.. | 15 | 15 | 10 | 10 | 20 | |
| 2 | Chromite, %.. | | | 33.3 | | | 24 |
| | Dolomitic magnesite, %.. | | | | 33.3 | 33.3 | |
| 3 | Chromite, %.. | 15 | 15 | | | | *30 |
| | Dolomitic magnesite, %.. | | | 17.5 | 17.5 | 35 | |

* Not spalled after 30 cycles.

The refractoriness of the brick has been tested by actual use in open-hearth furnaces at the maximum temperatures there prevailing. Not only did they perfectly withstand the furnace heat but they remained intact when all the brick about them had spalled badly, and they consequently remained as a projection into the furnace until the latter was shut down for repairs and the brick were removed for examination.

These brick were bonded with about 8% of a 50% solution of dextrine or lignin extract, although any suitable binder may be used. The mixture of materials used in any particular case, together with the bonding solution, is tempered in a pan mill and may then be satisfactorily molded at pressures normally used in the manufacture of brick. The brick are dried gradually at room temperature and are brought up to a temperature of about 110° C. before being fired.

Burning is carried out as in usual practice in the manufacture of magnesite brick at a temperature equivalent to cone 16 or 17.

It will be understood that substantial variation in the composition of the brick and in the particle size of its constituents is permissible within the scope of the invention, which is defined in the appended claims.

We claim:

1. A spalling-resistant, refractory and chemically neutral, burned brick containing 15 to 50% of chrome iron ore, and 50 to 85% of a dead-burned magnesian clinker which contains 10 to 25% of lime, and consisting of coarse and fine particles of which the chrome iron ore is the coarse constituent.

2. A spalling-resistant, refractory and chemically neutral, burned brick containing chrome iron ore, and a dead-burned mixture of grain magnesite and calcareous material so compounded as to contain 10 to 25% lime, and consisting of coarse and fine particles of which the chrome iron ore is coarser than 28 mesh.

3. A refractory brick consisting of the combination of 50 to 85% dead-burned magnesian clinker containing 10 to 25% of lime, the particle size of said clinker ranging from substantially 1.0 millimeters to dust, and 50 to 15% of chrome iron ore whose particle size varies from substantially 4.0 millimeters to substantially 0.5 millimeters.

4. A refractory brick consisting of the combination of substantially 70% dead-burned magnesian clinker containing substantially 18% lime and substantially 30% of chrome iron ore, the particle size of the chrome ore being coarser than that of the said clinker.

5. A spalling-resistant, refractory and chemically neutral brick consisting of chrome iron ore 30% and magnesian clinker 70%, half of said chrome iron ore ingredient being of particle size 8 to 10 mesh and the other half being of 10 to 14 mesh size, one half of said magnesian clinker ingredient being of particle size finer than 48 mesh and one-fourth of size 28 to 48 mesh with the remaining one-fourth of 14 to 28 mesh size, said clinker ingredient containing approximately 18% lime.

F. E. LATHE.
G. M. CARRIE.
JAMES W. CRAIG.
A. C. HALFERDAHL.